Patented May 21, 1929.

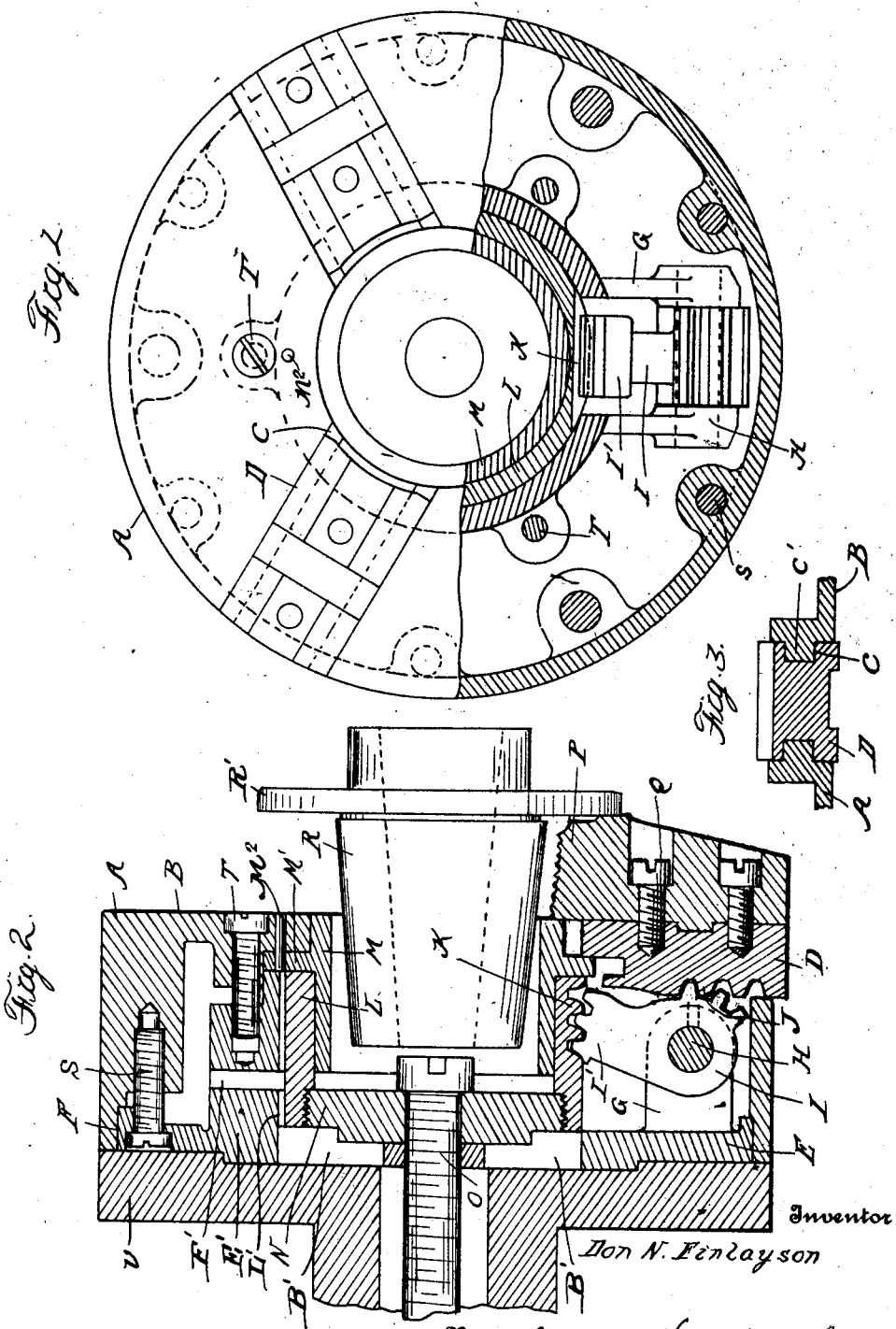

1,714,013

UNITED STATES PATENT OFFICE.

DON N. FINLAYSON, OF FLAT ROCK, MICHIGAN.

CHUCK.

Application filed January 23, 1920. Serial No. 353,528.

The invention relates to work-holding chucks such as are used in connection with machine tools and consists in the novel construction as hereinafter set forth.

In the drawings:

Figure 1 is a view in front elevation partially broken away and in section, of a chuck embodying features of the invention;

Figure 2 is a view in cross-section, with parts shown in elevation and with work inserted in the jaws;

Figure 3 is a cross-section through one of the jaw members.

My improved chuck is more particularly designed for use in connection with a pneumatic motor for operating the same, and the construction is such that the chuck may be connected to the pneumatic motor by a rod passing through the hollow spindle of the lathe or other tool. Another feature of importance is the provision in the center of the chuck for receiving a portion of the work, thereby permitting the jaws to grip the work without excessive over-hanging.

In detail, A is a hollow body member, preferably formed of cast metal, and having the front face B with the radially extending grooves C therein for receiving the jaw slides D. The opposite sides of the grooves C form guides for the jaw slides and preferably have a tongue and groove engagement therewith, as indicated at C'. E is a back plate which fits into a shoulder bearing F in the body A and which is provided with an enlarged central opening B'. Bifurcated bearings G extend inwardly upon one side of the opening opposite the jaw slides D. A projection E' extends inwardly from the plate at diametrically opposite points from the bearings. H are cross pins in the bifurcated bearings G, and I are gear segments journaled upon the pins H and intermeshing with the racks J on the inner face of the jaw slides D. The gear segments I have radially inwardly extending portions I' of greater radius and which are provided at their inner ends with gear segments for engaging rack teeth K on an annular member L. The member L is longitudinally slidable upon a dust sleeve M arranged concentrically with the body A and secured thereto by a radially outwardly extending flange M' having a transverse opening therethrough which receives a pin M² extending through the front face B of the body. The flange M' also extends over the rabbeted end portion of the jaw slide D and the sleeve may likewise be held in position by properly applied counter-sunk screws or the like (not shown). The arrangement is such that the space within the sleeve M will receive a portion of the work, permitting the jaws to engage an outer portion thereof. N is a head at the inner end of the annular rack member L, and O is a shoulder-screw engaging a central aperture in the head N and forming a means for connecting the same with the pull rod (not shown), which passes through the hollow spindle. A pin F' extends through the projection E' and engages a longitudinal groove L' formed in the annular member L and thereby prevents the latter from rotating. This construction guides the slidable member L so that the rack K will always mesh with the portions I' of the gear segments.

With the construction as thus far described, the jaw slides D will be simultaneously moved radially inward or outward by a longitudinal movement of the annular rack member L through the medium of the gear segments I and I' which are in effect bell crank levers for changing the direction of movement. The work is gripped by auxiliary jaws P, which are secured by screws Q to the jaw slides D and have their inner ends suitably formed for gripping the particular article which the chuck is designed to hold. Thus, as shown, a wheel hub R is indicated in full lines in Figure 2, and the jaws P engage the hub adjacent to the flange R' thereof, while the inner portion of the hub extends into the recess within the dust sleeve M.

The construction is one which is simple to manufacture and easy to assemble. Thus the body A and back plate E form the complete housing and are secured to each other by a series of peripheral screws S and inner screws T. The jaw slides D may be readily engaged with the guides C' and the segments I and I' with their journal pins H and the annular rack member L may all be assembled on the back member E before the latter is engaged with the body member A. The dust collar M may also be attached to the body before the engagement of the back member, after which the back member E and body are placed in engagement and secured by the screws S and T. The chuck may be mounted upon a suitable holding plate V, by which it is attached to the spindle of the lathe, and in operation, the jaws are quickly clamped or released by the pull or push of the actuating rod connected by the screw O.

What I claim as my invention is:

In a chuck in combination, a body having a face portion provided with a central opening, slots through the face portion radiating from the central opening, clamping members slidably mounted in the said slots, a reinforcing annular member secured directly to the overlapping parts of the segmental face portions defined by the slots at a plurality of points adjacent to the central opening and means carried by the body for actuating the clamping members.

In testimony whereof I affix my signature.

DON N. FINLAYSON